United States Patent
Wong et al.

(10) Patent No.: US 10,140,883 B2
(45) Date of Patent: Nov. 27, 2018

(54) SELF-LEARNING SURVEYS FOR OPEN-ENDED ANALYSIS

(71) Applicant: SURVEYMONKEY INC., Palo Alto, CA (US)

(72) Inventors: David Wong, Palo Alto, CA (US); Ken Goldberg, Mill Valley, CA (US)

(73) Assignee: SURVEYMONKEY INC., Palo Alto, CA (US)

( * ) Notice: Subject to any disclaimer, the term of this patent is extended or adjusted under 35 U.S.C. 154(b) by 290 days.

(21) Appl. No.: 15/244,887

(22) Filed: Aug. 23, 2016

(65) Prior Publication Data
US 2018/0061264 A1   Mar. 1, 2018

(51) Int. Cl.
*G09B 7/077* (2006.01)
*G09B 7/02* (2006.01)
*G09B 7/10* (2006.01)

(52) U.S. Cl.
CPC .............. *G09B 7/077* (2013.01); *G09B 7/02* (2013.01); *G09B 7/10* (2013.01)

(58) Field of Classification Search
None
See application file for complete search history.

(56) References Cited

U.S. PATENT DOCUMENTS

2006/0155513 A1* 7/2006 Mizrahi ............... G06Q 30/02
                                                        702/179
2014/0316856 A1* 10/2014 Williams ............. G06Q 30/02
                                                        705/7.32

* cited by examiner

*Primary Examiner* — Paul A D'Agostino
(74) *Attorney, Agent, or Firm* — Miller Nash Graham & Dunn LLP

(57) ABSTRACT

A method of automatically evolving survey questions includes receiving, at a processor, a first set of textual responses to at least one open-ended question in a survey, reformatting the first set of textual responses as a set of possible textual responses in the form of closed-ended questions with numerical ratings as options, storing the set of possible textual responses in a memory in communication with the processor, selecting and transmitting a subset of the set of possible textual response to survey recipients, receiving, at the processor, participant numerical ratings for each textual response, using the processor to generate a confidence measure and score for each possible textual response based upon the participant ratings, generating a ranked list, with the processor, including the confidence measures, storing the ranked list, and converting at least one of the original open-ended question in the survey to a closed-ended ended question, using a subset of the textual responses.

14 Claims, 7 Drawing Sheets

SELF-LEARNING SURVEYS FOR OPEN-ENDED ANALYSIS

TECHNICAL FIELD

This disclosure relates to automated surveys, more particularly to a computer system that automatically evolves open-ended questions into closed-ended questions ranked by numerical ratings.

BACKGROUND

Typically, surveys include "closed-ended" questions, which have a set of defined options for answers. Examples include true/false and multiple choice questions. In contrast, "open-ended" questions are those in which the respondents type in their answers. Examples may include "How can we improve the conference next year?" or "What steps can we take to improve customer service?" or "Who should we invite to speak at the product launch?"

Typically, evaluation of the textual responses to open-ended questions requires human analysts to read all of the responses. This incurs delays, errors, and analyst bias. Existing automated approaches include frequency analyses that may take the form of work cloud visualizations, and topic classification analysis that try to categorize the responses. These approaches cannot interpret content or discover rare but potentially insightful responses.

Another issue arises for large surveys. Open-ended questions are easy to compile when response numbers are low. When scaling to hundreds or thousands of responses, compilation and analysis can be prohibitively costly and time consuming.

DETAILED DESCRIPTION OF THE EMBODIMENTS

Figure 1:
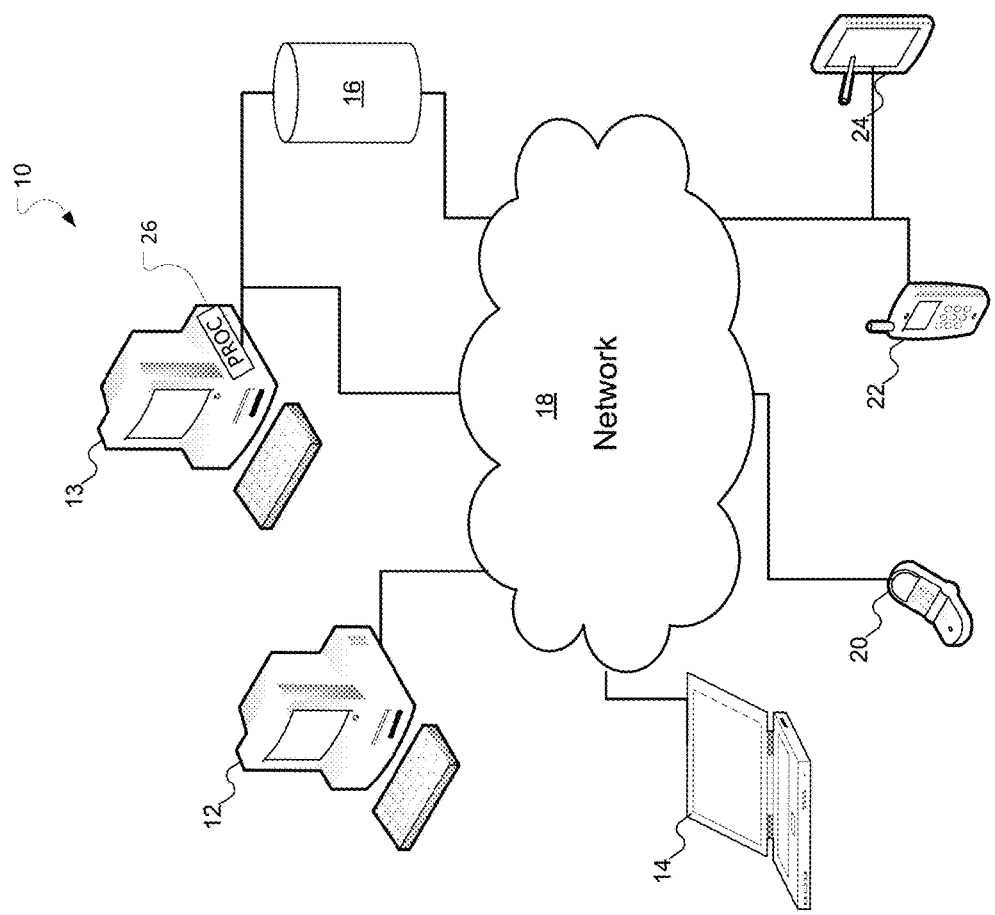
FIG. 1 shows a self-learning survey system.

The embodiments here aim to solve the problem surrounding the evaluation of open-ended feedback by taking a fundamentally different approach. A self-learning survey is a survey that iteratively determines the most insightful responses to open-ended questions posed on peer-to-peer evaluation as subsequent participants take the survey. The end result is quantified data surrounding the most salient insights from a set of open-ended responses, without requiring the survey administrator to read through all of the responses.

A self-learning survey contains a question that begins as an open-ended question and is sent out to participants. After an initial set of textual responses is collected, the self-learning survey begins presenting a subset of those textual responses to each of the next participants for numerical rating evaluation as to the textual response's value or insightfulness. As each participant submits both textual responses and numerical ratings of the textual responses from other participants, the self-learning survey system computes a new subset of textual responses for the next participant to rate. In effect, the self-learning survey system operates to evolve the content of the survey as new participants join, with the goal of iteratively identifying the most valuable textual responses and pruning out the less valuable textual responses.

This whole process is most effective if it occurs during the time between the automated survey going live and the reception of the final surveys from a particular population. Survey participants typically receive an email with a link to the automated survey, or, in the example of the conference attendees, receive notice of the survey in the conference handouts. When the survey goes 'live,' the collection process begins. The survey should evolve into including closed-ended questions replacing the original open-ended question while some percentage of available respondents still have not answered the survey. For example, if the conference has 2000 attendees, the data would be most useful if the evolution of the survey continues until a majority of the attendees have completed the survey. The time interval may be a matter of hours or days, so the system must operate in real-time or near real-time.

In this discussion, there are several different terms that have specific meanings. An open-ended question is one in which the user types in a textual response to the open-ended question. A 'textual response' is a user's response in which the user types in an answer to an open-ended question. A closed-ended question is one in which the user selects from a fixed set of choices. An evaluation or rating, also referred to as a numerical rating, is a measure of the users' opinion as to the value or insight of an item. The item may be a title or description of a book, movie, or a textual response as defined above. This may be better understood in terms of an example and in reference to FIGS. 1 and 2, with the example users interfaces of FIGS. 3-6.

Figure 2:
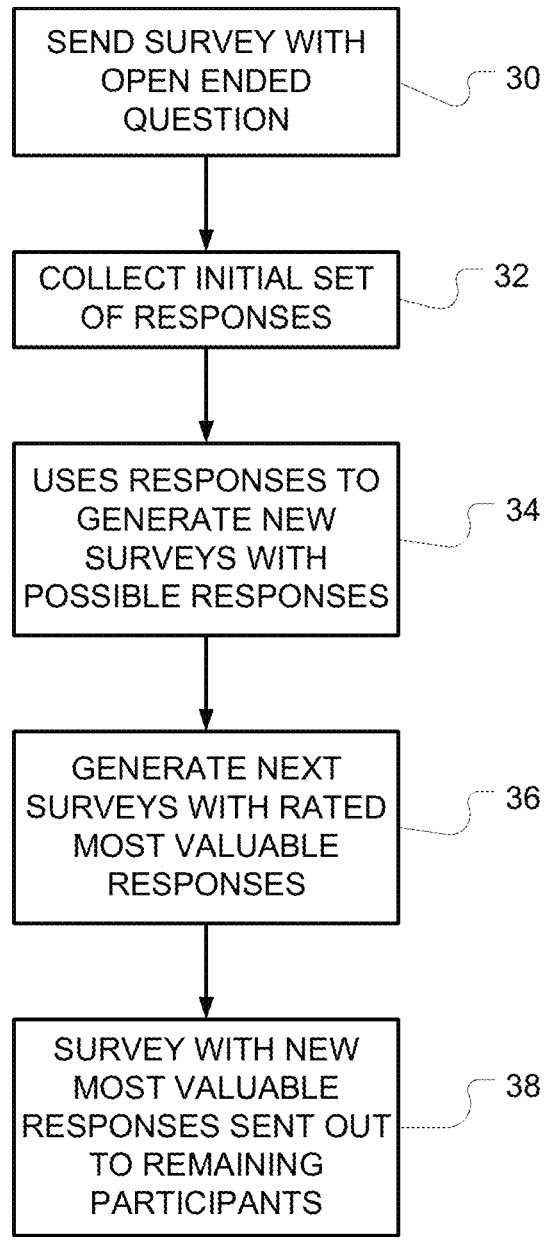
FIG. 2 shows a flowchart of an embodiment of a method of producing a self-learning survey.

FIG. 1 shows a self-learning survey system. In this system, the survey administrator users a computer such as 13 having a processor 26. The computer 13 has a connection, either through the network 18 or directly, to a database or other storage 16. The survey administrator develops and produces an automated survey having at least one open-ended question, as shown in the flowchart of FIG. 2. The survey may be set up and populated with questions from a user interface that allows access to the survey system, as shown in FIG. 3.

Figure 3:
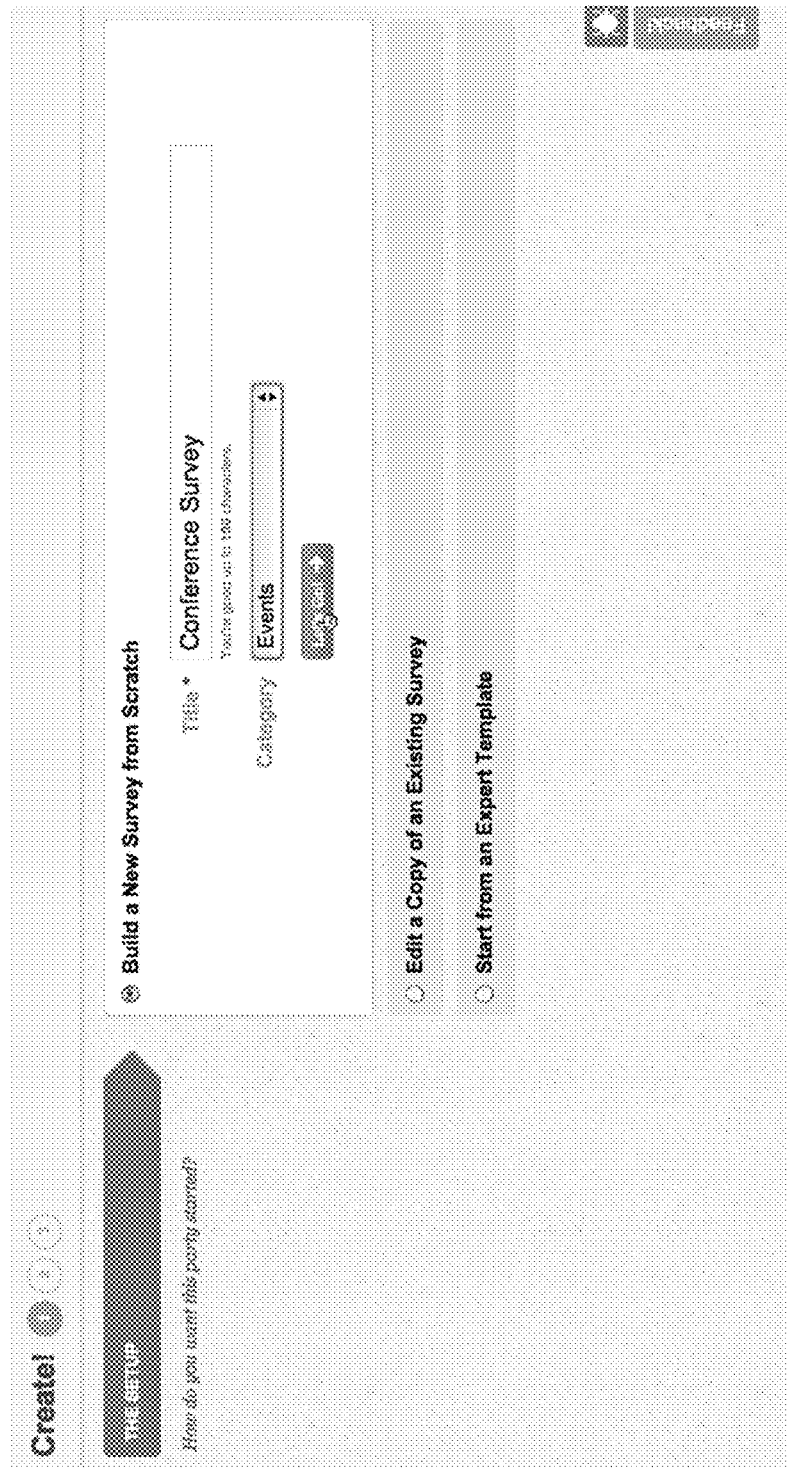
FIG. 3 shows an embodiment of a user interface for a survey system.
Figure 4:
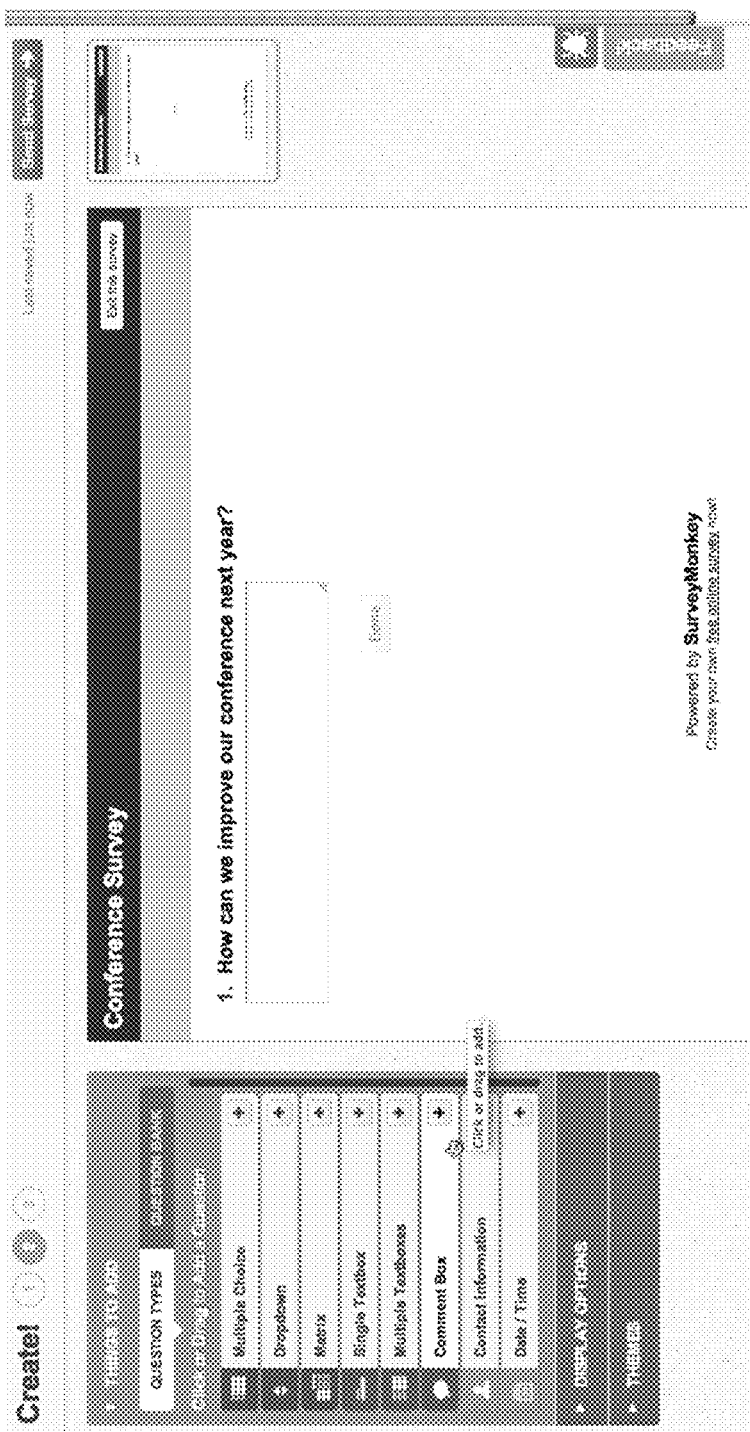
FIG. 4 shows an embodiment of a user interface having an open ended question.

In FIG. 3, the survey administrator selects to build a survey to gather feedback about a conference that the administrator or other party wants to gather. FIG. 4 shows the open-ended question of "How can we improve our conference next year?" Referring back to FIG. 2 at 30, this question is sent out to the conference attendees across the network 18 of FIG. 1. The users, or survey respondents, receive the link to the survey on their computing devices, which may include desk top computers such as 12, laptops 14, cell phones 20 or 22, and tablets such as 24, as examples.

Figure 5:
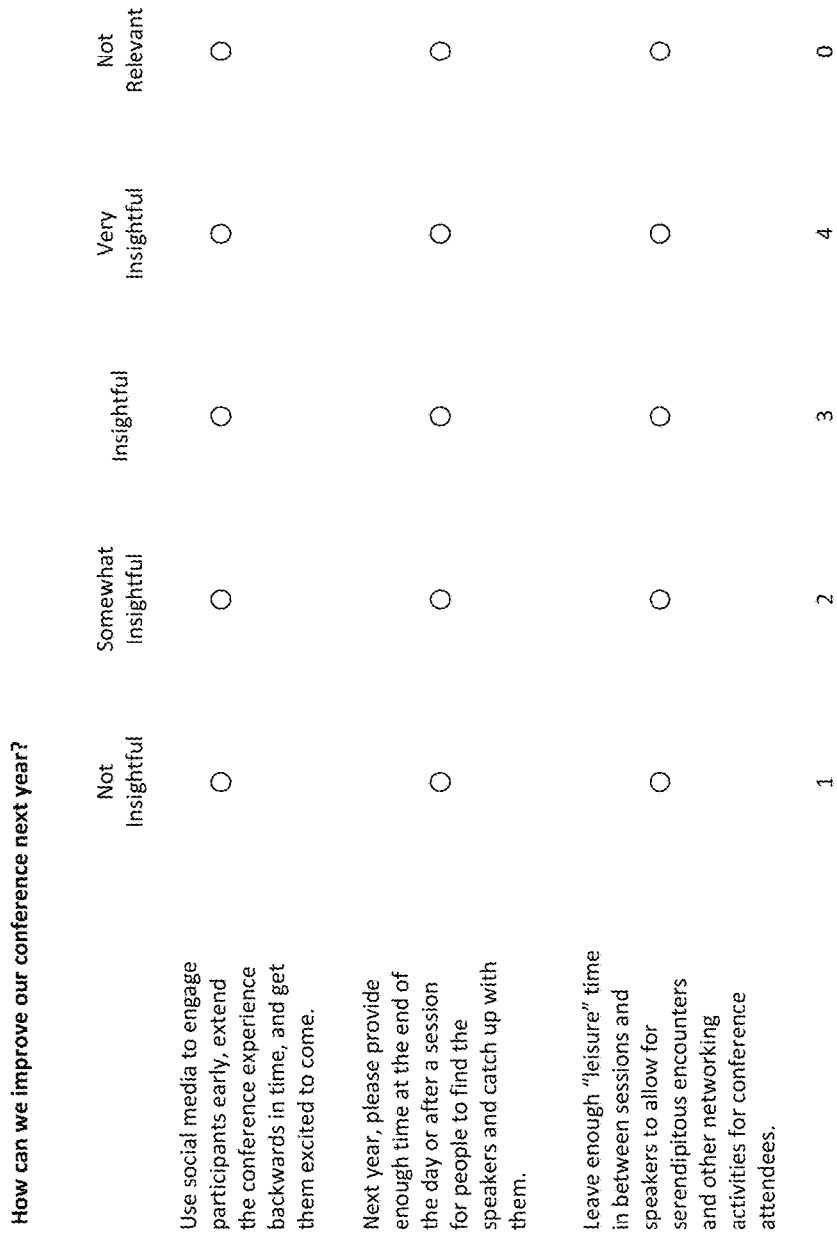
FIG. 5 shows an embodiment of a user interface allowing for numerical rating of three textual responses provided earlier to an open-ended question.

The initial users provide answers to the open ended question as an initial set of textual responses at 32 in FIG. 2. After collecting some predetermined number of textual responses, the system automatically uses these textual responses to populate a set of possible textual responses and stores them in the storage 16 of FIG. 1. In the next survey or set of surveys for subsequent participants who access the survey, a subset of the available textual responses is added to the surveys at 34. The addition is to seek evaluation of the insightfulness or value of an initial set of textual responses to the open-ended questions. FIG. 5 shows an embodiment of a set of possible textual responses being presented to a user to rate.

In the example of FIG. 5, four possible ratings for the textual response are provided, with a fifth choice of 0 for 'not relevant.' The user selects one of five options as to the insightfulness of each of the suggested textual responses. The user's numerical ratings are received as values 0-4, with 0 being "not relevant", 1 being 'not insightful,' and 4 being 'very insightful.' The system then uses a set of these numerical responses to generate an average or mean numerical rating for each textual response and a confidence value in the estimate of the average numerical rating of a textual response. This is based on the spread of numerical ratings valves. Textual responses having the same numerical rating across several users would have a high confidence measure, whereas textual responses having very different numerical ratings across several users would have a low confidence measure.

Subsets of textual responses are chosen by sampling from the existing pool of textual responses and using a notion of confidence as the textual response's weight for sampling so that numerical ratings for low confidence textual responses will be gathered until the confidence rises. The measure of confidence may take several forms. For example, the confidence measure could be based upon a number of responses, or one of many statistical analyses, or various aspects of that process. The following example discussed using the standard error of the mean, and then actually adjusting the score provided by the confidence in the score to generate a confidence-adjusted score. This is merely one example of a measure of confidence and is not intended to limit the scope of the claims.

One confidence measure could be the inverse of a standard error of the mean (SE) for the textual response's current set of numerical ratings evaluations as provided by survey participants. The standard error of the mean (SE) is the sample standard deviation of the numerical ratings values squared divided by the square root of the number of numerical ratings received:

$$SE = \frac{\sigma}{\sqrt{n}}.$$

Textual responses without evaluations can have a default low confidence measure. By sampling in this manner, the self-learning survey tends to choose textual responses that have a higher SE, which corresponds to textual responses with fewer ratings or a larger spread in their numerical ratings. These textual responses may require more numerical evaluations in order to have a higher confidence measure for the mean value data.

This can also be interpreted as focusing attention on textual responses with less agreement amongst the participants who have already evaluated that textual response. For example, consider textual responses R1, the social media textual response of FIG. 5, and R2, the leisure time textual response of FIG. 5, that are evaluated by participants on a numerical rating scale from 0 to 4. R1 is given a score of 3 by four participants. The SE of R1 is 0, meaning the self-learning survey is confident about R1's true mean value. Note that the value of the numerical rating, 3, is distinct from the confidence measure, and indicates that the textual response is insightful.

Figure 6:
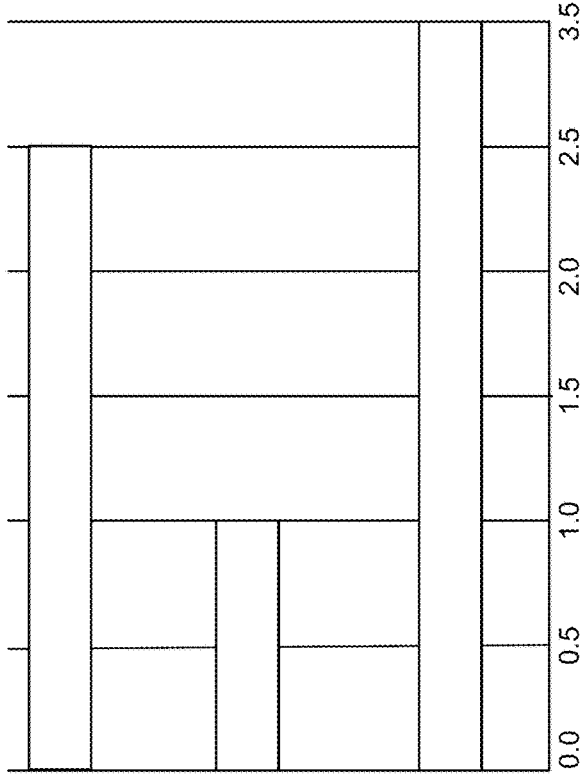
FIG. 6 shows an embodiment of an outcome from a self-learning survey.
Figure 7:
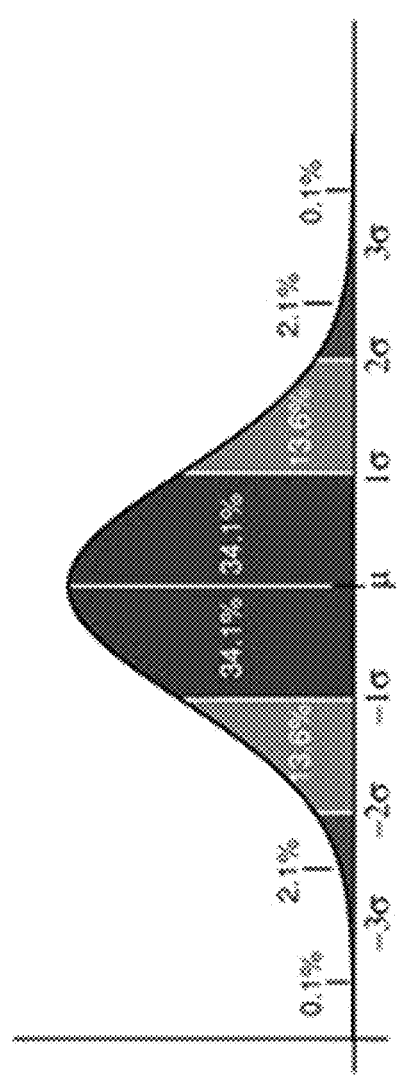
FIG. 7 shows a statistical model of numerical ratings used to prioritize textual responses for subsequent versions of the survey.

On the other hand, textual response R2 is given a numerical rating score of 1 by two participants and 4 by two other participants, its SE will be greater than 0, specifically around 0.866 or low confidence, giving it a better chance to be selected for future versions of the survey by the sampling algorithm. Intuitively, confidence based sampling allows the self-learning survey to learn as much as it can about the true value of each textual response per participant evaluation. FIG. 6 shows the possible textual responses and their average numerical ratings.

Further, as a further development of a confidence measure, the self-learning survey system can proactively eliminate textual responses that it is relatively confident are not of high value. Using a measure of confidence, such as the SE, the self-learning survey system can assign each textual response a rating adjusted by confidence. One such scoring model can be the Wilson score, $x-1.96*SE_x$, which is the lower bound of the 95% confidence interval of the mean, where x is the mean. In other words, in this embodiment the confidence measures comprise a confidence-adjusted score as a conservative measure of a textual response's true numerical rating value. Continuing with the two possible answers above, R1 would have a confidence-adjusted score of (3−1.96*0), or 3. R2's confidence-adjusted score would be (2.5−1.96*0.866), or 0.803. The standard error is the sample standard deviation divided by the square root of the sample size. The sample standard deviation is the square root of the sum of the squares of the differences between each value and the mean divided by the sample size minus one, in this case the differences are all 1.5, and each square is 2.25. The sample standard deviation is the square root of (2.25*4/3=9/3=3), or 1.732, making the SE=1.732/2, or 0.866.

Figure 8:
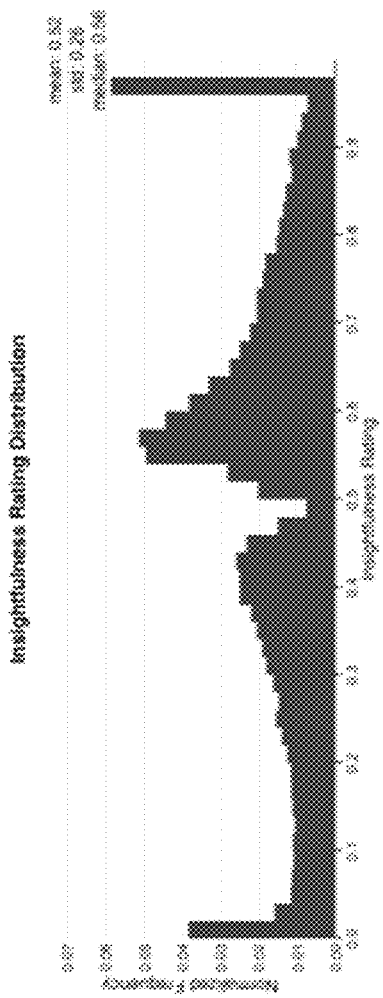
FIG. 8 shows a typical distribution of numerical ratings collected for a specific textual response.

If all textual responses in the pool have a confidence-adjusted score, the self-learning survey can set a threshold to prevent textual responses whose score is lower than the threshold from being included in future versions of the survey. One such threshold may be the 75th percentile of the confidence-adjusted scores. This threshold is dynamic as the self-learning survey gathers more numerical ratings evaluations by participants. Intuitively, pruning textual responses based on their confidence-adjusted score allows the self-learning survey to avoid gathering evaluations for textual responses that may not be very valuable. For example, if the answer evaluations of the 'leisure time' textual response of FIG. 5 is 1 "not insightful" with a confidence measure of 95%, that textual response can be ignored, as the system has a high confidence that the textual response is not insightful. FIG. 8 shows an example of an insightfulness rating distribution.

The combination of the confidence measure and pruning of textual responses allows the self-learning survey to efficiently gain information per survey participant and to avoid spending time and attention on textual responses that are not promising. Self-learning survey iterations can also alternate between gathering more open-ended textual responses to increase the pool of textual responses as opposed to computing a subset from the existing pool of textual responses for evaluation. This behavior can be configured by the survey administrator based on several variables, not limited by the total number of textual responses received thus far.

For example, the self-learning survey can be configured to gather a total of 2000 responses, begin sampling textual responses for evaluation when the first 20 textual responses are received, and alternate between soliciting new open-ended textual responses every third participant. The link provided to the potential respondents stays 'live' until some predetermined total number of responses is reached. Within that time, the system must receive a first set of surveys used to gather potential textual responses, send out the potential textual responses for evaluation, receive the evaluations and then adjust the survey to change the original open-ended question into a closed-ended question. During this period of time, the system may alternate between gathering new textual responses and adding those to the analysis. In order to provide some group of the potential respondents the 'final' version of the survey with the closed-ended question, this process has to occur in real-time, meaning while access to the survey is live and before the predetermined total number of responses has been received.

The self-learning survey inherently contains a ranked list of the highest rated textual responses based on the confidence-adjusted score. At any point, the survey administrator can view how this list changes as the self-learning survey iterates. The survey administrator can choose to run the self-learning survey on all of the participants, in which case they have a ranked list of responses for evaluation. On the other hand, if the administrator is satisfied with the insights gathered, he or she can eliminate the open-ended question to allow subsequent versions of the survey presented to focus on obtaining numerical ratings of the top textual responses.

The 'top textual responses' are those that have a high numerical rating, such as 3 or 4 in the previous example. These are then used to generate a new version of the survey with the open-ended question converted into close-ended questions as shown at 36 in FIG. 2. These new versions of the survey are then sent out to the remaining users. The converted questions and numerical ratings are then stored in the storage 16 of FIG. 1.

Other applications and modifications of this method are possible. For example, assume that another conference group wants an evaluation of their conference. When the new conference group survey administrator begins setting up the second conference survey, the database 16 of FIG. 1 may have 200 questions related to conferences in the storage 16. The system may offer these questions to the second survey administrator. As another example, typically most survey participants will not answer more than about 20 questions before they exit the survey, so the survey administrator does not want to have each participant answer 200 questions.

The administrator can use the mechanisms above to offer questions and ask not only for the answer to the question, but an evaluation of how useful the question is. These evaluations are used to generate confidence measures for the usefulness of the question, allowing the survey administrator to populate the next survey iterations with the most useful questions, where the most useful question are those for which the usefulness answer has a high confidence-adjusted score. This allows each future survey to efficiently collect answers to the most important questions, rather than having users answer questions that are less relevant.

The self-learning survey allows survey administrators to cast a wide net using an open-ended question and ultimately removes the difficultly in evaluating the resulting textual responses. Moreover, it provides quantifiable and actionable data in the form of textual responses and numerical ratings data for those textual responses.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method of automatically evolving survey questions, comprising:
   receiving, at a processor, a first set of textual responses to at least one open-ended question in a survey;
   reformatting the first set of textual responses as a set of possible textual responses in the form of closed-ended questions with numerical ratings as options;
   storing the set of possible textual responses in a memory in communication with the processor;
   selecting and transmitting a subset of the set of possible textual response to survey recipients;
   receiving, at the processor, participant numerical ratings for the possible textual response;
   using the processor to generate a confidence measure for each possible textual response based upon the participant numerical ratings;
   generating a ranked list using the confidence measure, with the processor;
   storing the ranked list of textual responses; and
   converting at least one of the original open-ended questions in the initial version of the survey to a closed-ended question, using a subset of the textual responses provided.

2. The computer-implemented method of claim 1, wherein selecting and transmitting a subset of possible textual responses comprises selecting and transmitting multiple subsets of different possible questions to different participants.

3. The computer-implemented method of claim 1, wherein receiving the participant ratings for each of the possible textual responses further comprises computing a confidence measure of the ratings.

4. The computer-implemented method of claim 1, wherein the confidence measure is based on a standard error of the mean.

5. The computer-implemented method of claim 1, wherein generating the ranked list comprises:
   gathering a set of possible textual responses to a question;
   determining a standard error of the mean for each of the possible textual responses; and
   prioritizing presentation of low confidence textual responses in subsequent versions of the survey.

6. The computer-implemented method of claim 1, wherein converting the at least one open-ended question to the closed-ended question comprises selecting a subset of textual responses that have a highest value of mean numerical rating values.

7. The computer-implemented method of claim 6, wherein converting the at least one open-ended question to the closed-ended question comprises selecting a subset of textual responses that have a highest Wilson score.

8. The computer-implemented method of claim 1, wherein the receiving and reformatting continues during the selecting and transmitting the subset of possible textual responses.

9. A computer-implemented method of automatically evolving survey questions, comprising:

receiving, at a processor, a first set of possible questions for a survey;

selecting and transmitting a subset of the first set of possible questions to survey recipients;

receiving, at the processor, participant ratings for each of the possible questions;

using the processor to generate a confidence measure for each question based upon the participant ratings;

generating a ranked list, with the processor, using the confidence measures;

storing the ranked list; and selecting a predetermined number of the ranked question list and presenting those on a next version of the survey.

10. The computer-implemented method of claim 9, wherein selecting and transmitting a subset of possible questions comprises selecting and transmitting multiple subsets of different possible questions to different participants.

11. The computer-implemented method of claim 9, wherein receiving the participant ratings for each of the possible questions further comprises computing a confidence measure of the ratings.

12. The computer-implemented method of claim 9, wherein the confidence measure is based on a standard error of the mean.

13. The computer-implemented method of claim 9, wherein generating the ranked list comprises:

gathering a set of possible question for a survey;

determining a standard error of the mean for each of the possible questions; and prioritizing presentation of low confidence responses in subsequent versions of the survey.

14. An automated survey system, comprising:

a first computing system having a processor, the first computing system transmitting an access to an electronic survey having at least one open-ended question;

at least one second computing system to receive the access to the electronic survey and to access the survey;

the processor to execute instructions causing the processor to:

receive a first set of textual responses to the at least one open-ended question;

reformat the first set of textual responses as a set of possible textual responses in the form of closed-ended questions with numerical ratings as options;

store the set of possible textual responses in the memory in communication with the processor;

select and transmit a subset of the set of possible textual response to survey recipients;

receive, at the processor, participant numerical ratings for each of the possible textual responses;

use the processor to generate a confidence measure for each possible textual response based upon the participant numerical ratings;

generate a ranked list, with the processor, including the confidence measures;

store the ranked list; and convert at least one of the original open-ended question in the survey to a closed-ended question, using a subset of the textual responses.

* * * * *